Sept. 9, 1924.
E. W. SEEGER
MOTOR CONTROLLER
Filed Oct. 11, 1922
1,508,131
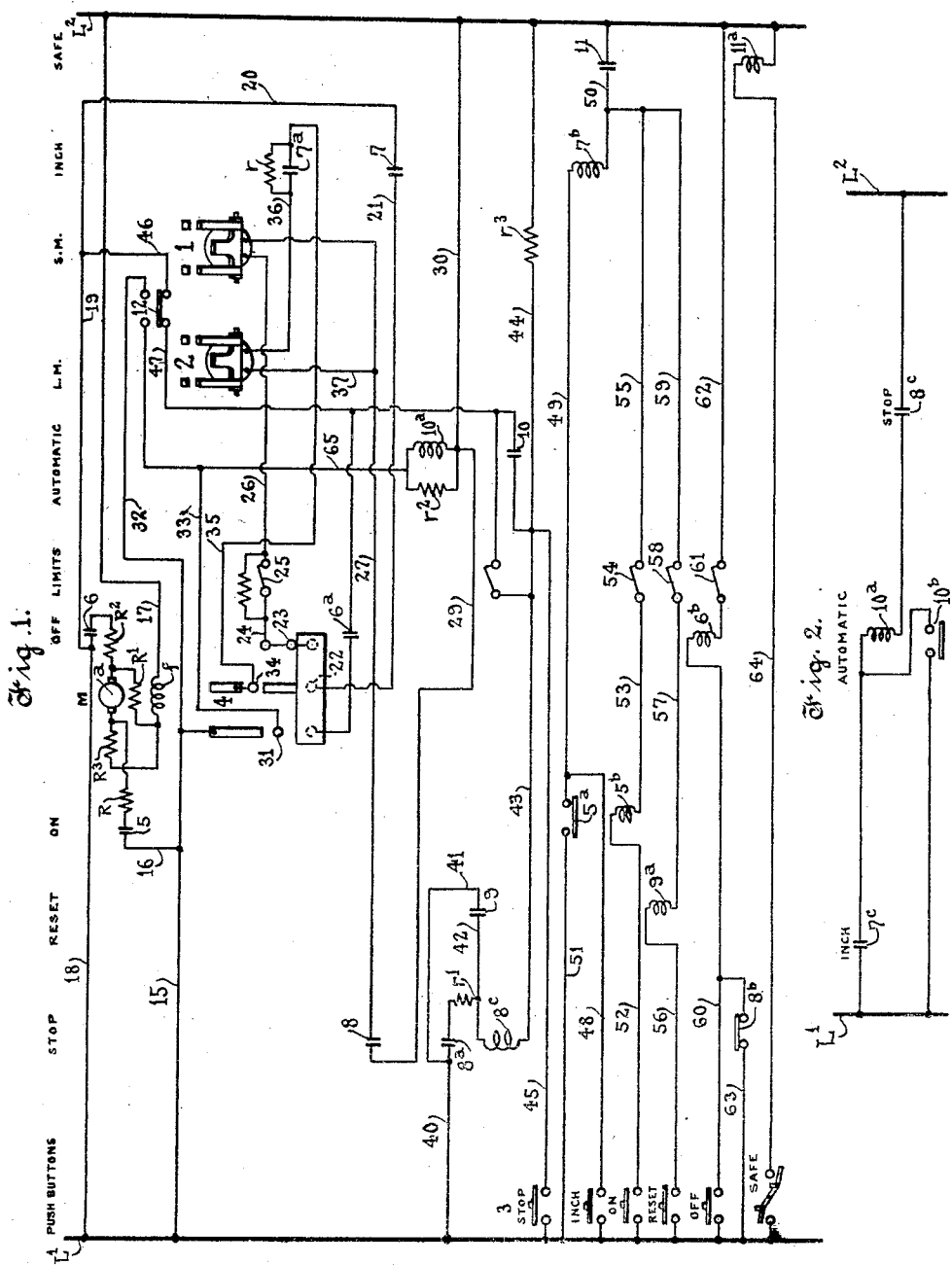
INVENTOR.
Edwin W. Seeger
BY
ATTORNEY Patented Sept. 9, 1924.

1,508,131

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed October 11, 1922. Serial No. 593,681.

*To all whom it may concern:*

Be it known that I, EDWIN W. SEEGER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers and while not limited thereto is particularly applicable to controllers for printing presses.

In Patent No. 1,422,134, granted on July 11, 1922, to Thomas H. Rodman, is disclosed a controller particularly designed for printing press service wherein provision is made to necessitate operation of a so-called "reset" switch prior to restarting by the usual starting means following stopping in certain ways.

The protection afforded by such controller is extremely desirable and the present invention has among its objects to render restarting under other conditions also dependent upon operation of the reset switch.

More specifically the invention has among its objects to provide a controller of the character aforedescribed wherein provision is made to necessitate operation of the reset switch prior to restarting following stopping by failure of voltage.

Another object is to provide such a controller wherein provision is also made to necessitate operation of the reset switch prior to each inching operation of the press.

Other objects and advantages of the invention will hereinafter appear.

The accompanying drawing illustrates a controller embodying the invention in one form and the same will now be described it being understood that the controller illustrated is susceptible of various modifications without departing from the scope of the appended claims.

In the drawing,

Figure 1 is a diagrammatic view of a controller particularly designed for a direct current motor; and Fig. 2 is a diagrammatic view showing a modification of the controller which is especially desirable where the controller is employed for an alternating current motor and is itself designed to operate on such current.

Referring to Fig. 1 the same illustrates electro-magnetic switches 1 and 2 respectively serving to control the small and large motors of the usual two-motor press drive. The controlled motors and their well known connections have been omitted in order to simplify the disclosure and to the same end the controller as a whole has been illustrated in an "across-the-line" manner, with the several contacts and winding of each switch vertically aligned under a legend denoting the function thereof.

Switches 1 and 2 are controllable by a push-button control station 3 through the medium of certain relays hereinafter described and a controller 4 of the crosshead type driven by a pilot motor M having an armature $a$ and series field winding $f$. The controller 4 is of a well known type the crosshead thereof being operable in reverse directions by reversal of motor M and the crosshead when in the position illustrated rendering both switches 1 and 2 unresponsive, assuming the hereinafter described relays to be in the positions illustrated.

However, the crosshead when in the position illustrated enables completion of the energizing circuit of switch 1 for operation of the small motor for inching but subject to deenergization upon release of the inching instrumentality. On the other hand when the crosshead is set in operation it first completes the energizing circuit of switch 1 and thereafter completes the energizing circuit of switch 2 interrupting the energizing circuit of switch 1.

The aforementioned relays include the following: an "on" relay having normally open contacts 5 in circuit with motor M, normally open contact $5^a$ and an operating winding $5^b$; and "off" relay having normally open contacts 6 in circuit with motor M, normally open contacts $6^a$ in circuit with controller 4 and an operating winding $6^b$; an "inch" relay having normally open contacts 7 in circuit with the controller for and winding of switch 1, normally open contacts $7^a$ controlling a resistance $r$ in circuit with the winding of switch 2 and an operating winding $7^b$; a "stop" relay having normally open contacts 8 in circuit with the windings of switches 1 and 2, normally open contacts 8$^a$, normally closed contacts 8$^b$ and an operating winding 8$^c$; a "reset" relay having normally open contacts 9 in circuit with the winding of the "stop" relay and an operating winding 9$^a$; a "safe after inch" relay or for brevity an "automatic" relay having normally open contacts 10 controlling a shunt around the winding of the "stop" relay and an operating winding 10$^a$; a "safe" relay having normally open contacts 11 in circuit with the windings of the "inch," "on" and "reset" relays and an operating winding 11$^a$.

These relays with the exception of the "automatic" relay have individual control switches at control station 4 and except for the "safe" switch all of such control switches are of the normally open push button type. The "inch," "on," "reset" and "off" control switches are depressible to energize their respective relays subject to de-energization of each of the latter upon release of its respective control switch. On the other hand the "stop" switch is depressible to de-energize its respective relay, said relay being energized by the "reset" relay and being maintained by a circuit through its own contacts 8$^a$ and a resistance $r'$.

Thus it will be observed that the "stop" relay serves upon failure of voltage to de-energize by opening of its contacts 8 both the small motor switch 1 and large motor switch 2 and further serves to prevent re-energization thereof pending restoration of normal voltage and energization of the "reset" relay by its control switch. As will be apparent the contacts 8 must be reclosed prior to re-energization of either switch 1 or switch 2 and as previously pointed out the operating winding of contacts 8 is dependent for energization upon response of the "reset" relay which is energized by depression of its control switch and de-energized by release of the latter.

Further the "automatic" relay provides for deenergizing the "stop" relay following each inching operation whereby the "reset" switch must be operated for re-energization of the "stop" relay prior to restarting. The "automatic" relay as stated controls a shunt around the winding of the "stop" relay, said shunt also including the down contacts of a switch 12 associated with and operable by switches 1 and 2, said switch 12 having contacts which in its up position complete the energizing circuit of the winding 10$^a$ of "automatic" relay. The switch 12 is moved to its up position to energize the "automatic" relay when either switch 1 or switch 2 is closed and is released to de-energize the "automatic" relay and to close circuit through its down contacts when the switches 1 and 2 open. The winding 10$^a$ of the "automatic" relay has a shunt including a resistance $r^2$ or other preferred means for delaying opening of said relay to permit the switch 12 to first engage its down contacts whereby said relay and said switch jointly serve to momentarily shunt the winding of the "stop" relay for de-energization of the latter relay. Thereupon the "automatic" relay opens to interrupt said shunt.

Thus assuming switch 1 to be energized for inching, the "automatic" relay is energized as described but without effecting completion of the shunt around the winding of the "stop" relay due to prior interruption of the continuity of said shunt by operation of switch 12 to its up position. On the other hand release of switch 1 to terminate the inching operation releases switch 12 to de-energize the "automatic" relay as described to momentarily shunt the winding of the "stop" relay for de-energization of the latter relay. Consequently the "stop" relay must be again energized prior to restarting and as aforedescribed its energization necessitates energization of the "reset" relay by its push button switch.

The controller in addition to the foregoing includes a number of limit switches to be operated by the controller 4 in a well known manner to control the aforedescribed relays in a manner apparent from the circuit connections now to be described.

The circuit of pilot motor M when completed by the "on" relay extends from line L' by conductors 15 and 16 through "on" relay contacts 5 and resistance R to and through the motor armature $a$ from left to right and thence through resistance R' and series field winding $f$ by conductor 17 to line L$^2$. On the other hand when the "off" relay is closed the circuit of said motor extends from line L' by conductor 18 through "off" relay contacts 6 and resistance R$^2$ to and through the motor armature from right to left and thence through resistance R$^3$ and series field winding $f$ by conductor 17 to line L$^2$.

The circuit of switch 1 assuming closure of the "inch" relay extends from line L' by conductors 18, 19 and 20 through "inch" relay contacts 7 by conductor 21 to contact 22 of controller 4 thence through the crosshead of said controller to contacts 23 by conductor 24 through limit switch 25 by conductor 26 to and through the winding of switch 1 by conductor 27 through "stop" relay contacts 8 and thence by conductors 29 and 30 to line L$^2$. In this connection it is to be noted that if the crosshead of the controller is moved upwardly as hereinafter described the energizing circuit of switch 1 is maintained by the crosshead bridging contacts 23 and contact 31 of the controller. Under such conditions circuit may be traced from line L' by conductors 15 and 32 through the up contacts of switch 12 operated by switch 1 by conductor 33 to contact 31 and thence through the crosshead to contacts 23 and through the winding of switch 1 as already traced. As will be apparent these connections are maintained until the crosshead disengages contacts 23 whereupon the switch 1 is de-energized.

The energizing circuit of switch 2, assuming the crosshead of the controller 4 to engage contact 34 which it does prior to de-energizing switch 1, may be traced from line L' to controller contact 31 as already traced thence through the crosshead to controller contact 34 by conductor 35 to and through the contacts 7$^a$ of the "inch" relay, which as will appear is now energized by the controller 4, by conductor 36 to and through the winding of switch 2 by conductors 37 and 27 through contacts 8 of the "stop" relay and thence to line L$^2$ as already traced.

The energizing circuit of the "stop" relay extends from line L' by conductors 40 and 41 through contacts 9 of the "reset" relay by conductor 42 to and through the winding 8$^c$ by conductors 43 and 44 through resistance $r^3$ to line L$^2$ assuming momentary closure of the "reset" relay. Assuming energization of the "stop" relay winding 8$^c$ and subsequent de-energization of the "reset" relay said winding is maintained energized by a connection through resistance $r'$ and its contacts 8$^a$ by conductor 40 to line L'. The connections for the "stop" relay controlled by its push button switch may be traced from line L' through said switch by conductor 45 to conductor 44 thus providing a short-circuit for the winding of said relay to de-energize the same. On the other hand the shunt for the winding of the "stop" relay which is controlled by the "automatic" relay may be traced from line L' by conductors 18, 19 and 46 through the down contacts of switch 12 by conductor 47 through the "automatic" relay contacts 10 to conductor 44.

The energizing circuit of the "inch" relay may be traced from line L' through the "inch" push button switch by conductors 48 and 49 through winding 7$^b$ of said relay by conductor 50 through the contacts 11 of the "safe" relay to line L$^2$ assuming prior closure of said "safe" relay. Another energizing circuit for the "inch" relay may be traced from line L' by conductor 51 through contacts 5$^a$ of the "on" relay, when the latter relay is energized, to conductor 49 and thence to and through the winding of the "inch" relay as already traced. Accordingly it will be observed that energization of the "on" relay to effect movement of the crosshead also energizes the "inch" relay to engage its contacts 7$^a$ as above set forth in connection with the description of connections of switch 2.

The energizing circuit of the "on" relay may be traced from line L' through the "on" push button switch by conductor 52 through the winding 5$^b$ of said relay by conductor 53 through a limit switch 54 by conductors 55 and 50 through the safe relay contacts 11 to line L$^2$.

The energizing circuit of the "reset" relay extends from line L' through the "reset" push button switch by conductor 56 through the relay winding 9$^a$ by conductor 57 through limit switch 58 by conductors 59 and 50 through the safe relay contacts 11 to line L$^2$.

The energizing circuit of the "off" relay extends from line L' through the "off" push button switch by conductor 60 through the relay winding 6$^b$ and limit switch 61 by conductor 62 directly to line L$^2$. Also the "stop" relay when de-energized is adapted to establish an energizing circuit for the "off" relay this circuit extending from line L' by conductor 63 through "off" relay contacts 8$^b$ to conductor 60 and thence through the winding 6$^b$ as already traced.

The energizing circuit of the "safe" relay may be traced from line L' through the "safe" push button switch by conductor 64 through winding 11$^a$ to line L$^2$.

The energizing circuit of the "automatic" relay may be traced from line L' by conductors 15 and 32 through the "up" contacts of switch 12 by conductors 33 and 65 through relay winding 10$^a$ and resistance $r^2$ in parallel by conductor 30 to line L$^2$.

Referring now to Fig. 2 the same shows the "automatic" relay winding 10$^a$ connected across lines L' and L$^2$ through additional contacts 7$^c$ of the "inch" relay on one side and additional contacts 8$^c$ of the "stop" relay on the other side, said "automatic" relay having additional contacts 10$^b$ to shunt the "inch" relay contacts 7$^c$, all of said contacts being open when their respective relays are de-energized. This arrangement, which is applicable to both D. C. and A. C. systems provides for delayed opening of the "automatic" relay without dependence upon the resistance shunt circuit aforedescribed. As will be observed the "automatic" relay is energized upon response of the "inch" relay and is maintained energized by its own contacts 10 pending interruption of its circuit by de-energization of the "stop" relay. Obviously, therefore, the "automatic" relay will function in conjunction with the switch 12 to shunt the winding of the "stop" relay for de-energization of the latter relay following each inching operation.

What I claim as new and desire to secure by Letters Patent is:

1. In a motor controller the combination with starting and stopping means including means to effect stopping upon failure of voltage and to insure against restarting pending manual operation of a part thereof, of other means including a part requiring manual operation in addition to the aforementioned manual operation to effect restarting following failure of voltage.

2. In a motor controller the combination with starting and stopping means including manually operable means to effect starting and means requiring operation of said manual means for restarting following failure of voltage, of means requiring manual operation of a part thereof following failure and subsequent restoration of voltage to render the aforementioned manual means effective for restarting.

3. In a motor controller the combination with starting and stopping means including means to effect stopping at will or upon failure of voltage and in either event to insure against restarting pending manual operation of a part thereof, of additional means requiring manual operation of a part thereof to permit restarting by the former means following stopping at will or by failure of voltage.

4. In a motor controller the combination with starting and stopping means whereby the controlled motor may be inched or started and stopped at will, said means including means necessitating a manual operation to effect restarting following a failure of voltage, of additional means requiring manual operation of a part thereof to permit restarting by the former means following either failure of voltage or stopping incident to inching or stopping at will.

5. In a motor controller the combination with starting and stopping means including a manual start element and a relay requiring energization to render said element effective, said relay when de-energized effecting stopping, of means requiring manual operation of a part thereof to effect re-energization of said relay when de-energized from any cause.

6. In a motor controller the combination with starting and stopping means including manual start and stop elements and a relay requiring energization to render the former of said elements effective, said relay being de-energizable by the latter of said elements and also by failure of voltage to effect stopping, of other control means for said relay whereby re-energization of the latter following de-energization thereof from any cause is dependent upon a manual operation.

7. In a motor controller the combination with starting and stopping means including manual start, stop and inch elements and a relay requiring energization to render said start and inch elements effective, said relay being de-energizable by said stop element to effect stopping, of means to effect de-energization of said relay following each inching operation and other control means for said relay whereby re-energization of the latter following de-energization thereof from any cause is dependent upon a manual operation.

In witness whereof, I have hereunto subscribed my name.

EDWIN W. SEEGER.